No. 669,539. Patented Mar. 12, 1901.
T. MILLER.
SEPARATOR.
(Application filed June 22, 1900.)
(No Model.) 2 Sheets—Sheet 1.

Witnesses:
John Becker.
William Schulz.

Inventor:
Theodore Miller
by his attorneys
Roeder & Briesen

THE NORRIS PETERS CO., PHOTO-LITHO., WASHINGTON, D. C.

No. 669,539. Patented Mar. 12, 1901.
T. MILLER.
SEPARATOR.
(Application filed June 22, 1900.)
(No Model.) 2 Sheets—Sheet 2.

Witnesses:
John Becker.
William Schulz.

Inventor:
Theodore Miller
by his attorneys
Roeder & Biesen

UNITED STATES PATENT OFFICE.

THEODORE MILLER, OF NEW YORK, N. Y.

SEPARATOR.

SPECIFICATION forming part of Letters Patent No. 669,539, dated March 12, 1901.

Application filed June 22, 1900. Serial No. 21,137. (No model.)

*To all whom it may concern:*

Be it known that I, THEODORE MILLER, a citizen of the United States, and a resident of New York city, county and State of New York, have invented certain new and useful Improvements in Steam and Water Separators, of which the following is a specification.

This invention relates to a novel apparatus for effectively separating water, oil, or other substances from steam, so that the latter is delivered to the engine in a thoroughly-dried condition.

Figure 4:
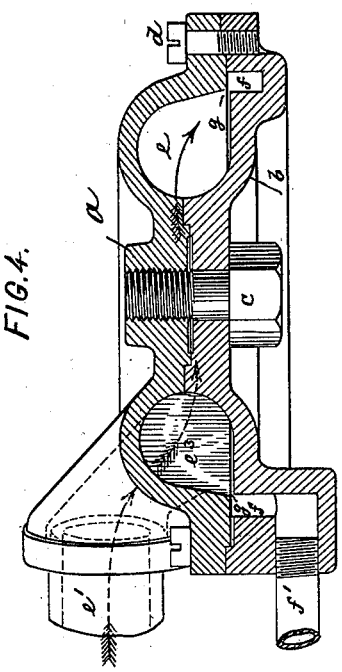
Figure 2:
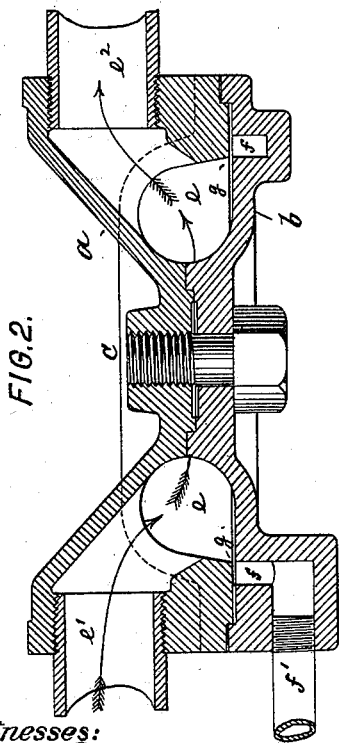
Figure 3:
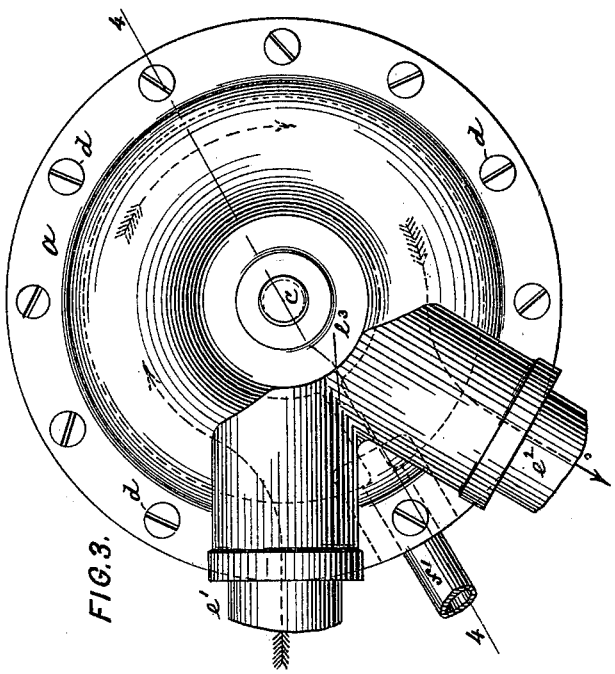
Figure 1:
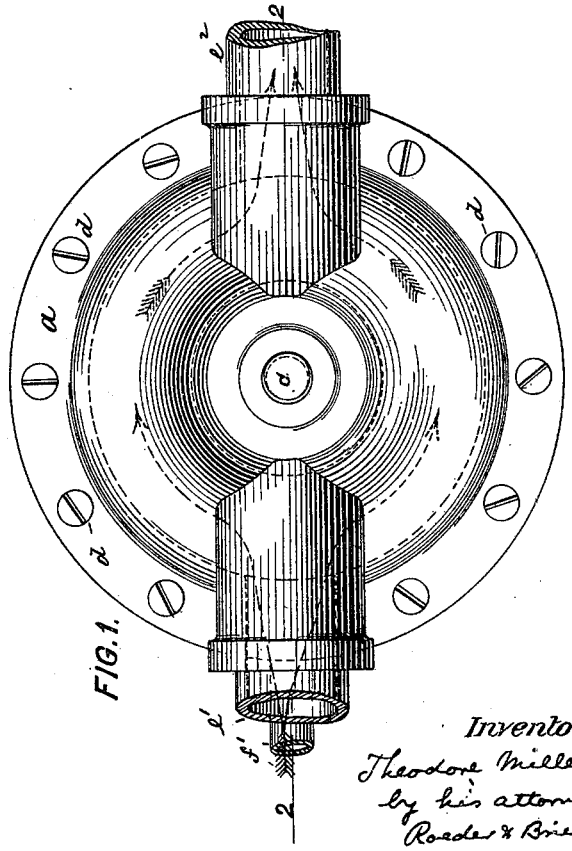
Figure 5:
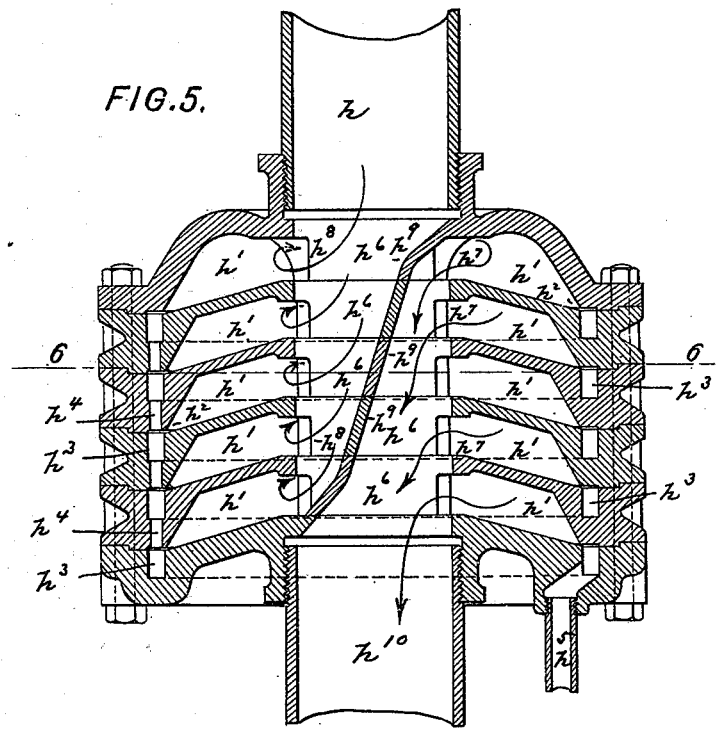

In the accompanying drawings, Figure 1 is a plan of my improved steam and water separator. Fig. 2 is a section on line 2 2, Fig. 1; Fig. 3, a plan of a modification; Fig. 4, a cross-section on line 4 4, Fig. 3; Fig. 5, a vertical section of a further modification on line 5 5, Fig. 6; and Fig. 6, a horizontal section on line 6 6, Fig. 5.

Briefly stated, the separator is composed of a curved steam-chamber having a slot extending along its outer periphery, which communicates with a curved concentric water-pocket arranged outside of and below the steam-chamber.

$a$ $b$ represent the two sections of the separator, connected by a central bolt $c$ and by peripheral bolts or screws $d$. Within the upper section $a$ is formed the curved steam-chamber $e$, which is of annular or equivalent form, so as to be curved in the direction of the flow of the steam. This steam-chamber is shown to be formed in cross-section of a curved inner side and of tangential outer sides, which is the preferred form, as it deflects the water and other impurities directly by centrifugal force to the angle formed between the two tangents at the outer circumference of the chamber.

Into the chamber $e$ enter the steam-inlet passage $e'$ and the steam-outlet passage $e^2$. These may either be arranged diametrically opposite, as shown in Figs. 1 and 2, or side by side, with a dividing-partition $e^3$ in the steam-chamber, as in Figs. 3 and 4. In the former case the steam flows in two divided streams from the inlet toward the outlet, while in the latter case the steam flows in a single stream from inlet to outlet.

Within the lower section $b$ is formed the pocket $f$ for receiving the water, oil, or other liquid substances that are separated from the steam. This pocket is arranged outside of and below the chamber $e$, concentric thereto. It connects with such chamber by a narrow curved slot $g$ between the sections $a$ $b$, which thus establish communication between the outer lowermost circumference of the steam-chamber and the inner uppermost circumference of the pocket.

A pipe $f'$, entering pocket $f$, serves to discharge the collected water and convey it either back into the boiler or to any other point desired.

The steam admitted at inlet $e'$ is carried through the chamber $e$ and is there subjected to centrifugal action, due to its high velocity and the curvature of the chamber. In this way all the water carried along will be forced toward the outer circumference of the chamber farthest from the center of curvature and through the annular slot $g$ into the pocket $f$. Thus the efficiency of the separator is greatly increased, while the steam is prevented by the narrow channel from imparting its high velocity to the water within the pocket $f$, which will thus not be whirled back into the steam-current.

Figure 6:
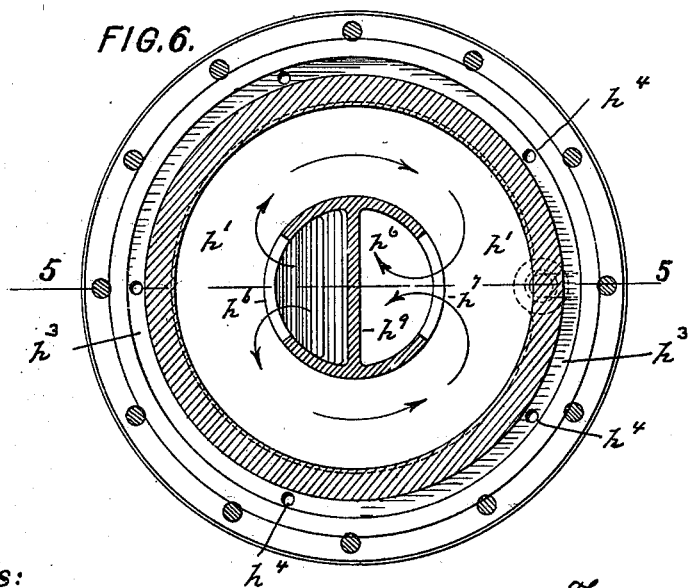

In Figs. 5 and 6 the separator is shown to be built in tiers, so as to give small centrifugal diameters to steam-pipes of large cross-section. In this modification the steam is admitted through pipe $h$ to the center of the steam-separating chambers $h'$, communicating by narrow slots $h^2$ with the pockets $h^3$. These pockets are connected by drains $h^4$ and discharge the accumulated water, &c., through pipe $h^5$. Each chamber is provided with a central flange or ring $h^6$, such rings forming in effect a continuation of pipe $h$. The rings $h^6$ are provided at one side with an inlet-opening $h^7$ and at the other side with an exit-opening $h^8$, separated by a transverse partition $h^9$. The partitions $h^9$ in the several rings $h^6$ are so arranged that they collectively form a diagonal wall extending transversely through the tier of rings. The steam enters simultaneously, through openings $h^8$, the several chambers $h'$ above partitions $h^9$, and then through openings $h^7$ reënters the rings below the partitions, to be discharged through pipe $h^{10}$.

What I claim is—

1. A steam and water separator composed of an annular steam-chamber, a curved concentric water-pocket arranged below and beyond the steam-chamber, and of a curved slot that connects the outer circumference of the steam-chamber with the inner circumference of the water-pocket, substantially as specified.

2. A steam and water separator composed of an upper section provided with an annular steam-chamber, a lower section provided with a concentric water-pocket arranged below and beyond the steam-chamber, a curved slot between the sections that connects the outer circumference of the steam-chamber with the inner circumference of the water-pocket, and means for connecting the sections, substantially as specified.

3. A steam and water separator composed of an annular steam-chamber having in cross-section a curved inner side and tangential outer sides, a curved concentric water-pocket arranged below and beyond the steam-chamber, and of a curved slot that connects the outer circumference of the steam-chamber with the inner circumference of the water-pocket, substantially as specified.

4. A steam and water separator composed of an annular steam-chamber having a steam inlet and outlet, a curved concentric water-pocket having a water-outlet and arranged below and beyond the steam-chamber, and of a curved slot that connects the outer circumference of the steam-chamber with the inner circumference of the water-pocket, substantially as specified.

Signed by me at New York city, county and State of New York, this 21st day of June, 1900.

THEODORE MILLER.

Witnesses:
WILLIAM SCHULZ,
F. V. BRIESEN.